(12) United States Patent
Borla

(10) Patent No.: US 10,082,059 B2
(45) Date of Patent: Sep. 25, 2018

(54) RECOVERY OF ELECTRICAL ENERGY AND WATER FROM EXHAUST GAS

(71) Applicant: Borla Performance Industries, Inc., Johnson City, TN (US)

(72) Inventor: Alexander Borla, Johnson City, TN (US)

(73) Assignee: Borla Performance Industries, Inc., Johnson City, TN (US)

( * ) Notice: Subject to any disclaimer, the term of this patent is extended or adjusted under 35 U.S.C. 154(b) by 69 days.

(21) Appl. No.: 15/213,842

(22) Filed: Jul. 19, 2016

(65) Prior Publication Data

US 2017/0082000 A1    Mar. 23, 2017

Related U.S. Application Data

(60) Provisional application No. 62/219,829, filed on Sep. 17, 2015.

(51) Int. Cl.
*F01N 3/05* (2006.01)
*F01N 3/00* (2006.01)
*F01N 5/02* (2006.01)

(52) U.S. Cl.
CPC ............. *F01N 3/055* (2013.01); *F01N 3/005* (2013.01); *F01N 5/025* (2013.01); *F01N 2240/02* (2013.01); *F01N 2240/04* (2013.01); *F01N 2240/22* (2013.01); *F01N 2260/02* (2013.01); *Y02T 10/16* (2013.01); *Y02T 10/20* (2013.01)

(58) Field of Classification Search
CPC ............. F01N 2240/02; F01N 2240/04; F01N 2240/22; F01N 3/055; F01N 3/005; F01N 5/025; F01N 2260/02; Y02T 10/16; Y02T 10/20
USPC ........................................................... 60/309
See application file for complete search history.

(56) References Cited

U.S. PATENT DOCUMENTS

| | | | | |
|---|---|---|---|---|
| 9,074,491 | B2* | 7/2015 | Kim | F01K 7/22 |
| 2013/0219872 | A1* | 8/2013 | Gibble | F01K 15/02 |
| | | | | 60/320 |
| 2015/0292380 | A1* | 10/2015 | Ballinger | F01N 3/0892 |
| | | | | 429/422 |
| 2016/0138532 | A1* | 5/2016 | Son | F02M 26/30 |
| | | | | 60/605.2 |
| 2016/0369688 | A1* | 12/2016 | Hamad | F02M 25/12 |

* cited by examiner

*Primary Examiner* — Laert Dounis
*Assistant Examiner* — Kelsey Stanek
(74) *Attorney, Agent, or Firm* — Luedeka Neely Group, PC

(57) ABSTRACT

A system for recovering electrical energy and water from exhaust gasses. The system includes a thermoelectric generator to produce electricity from the waste heat of the exhaust gasses of internal combustion engines and the like. The exhaust is cooled by the thermoelectric generator, air cycle machine and other heat absorbing devise which, through work, reduce the exhaust gas temperature and promote condensation of the water.

1 Claim, 1 Drawing Sheet

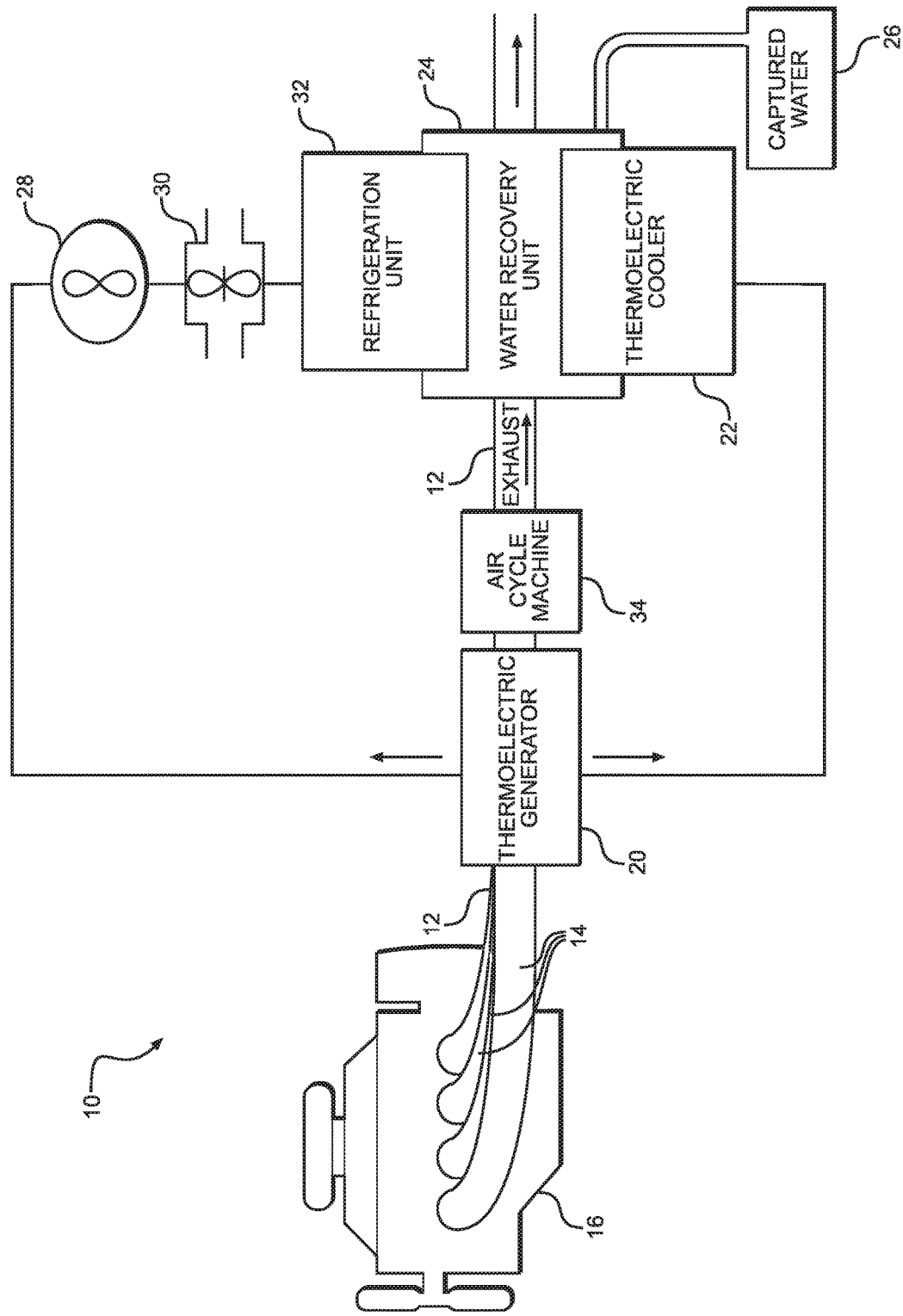

RECOVERY OF ELECTRICAL ENERGY AND WATER FROM EXHAUST GAS

CROSS-REFERENCE TO RELATED APPLICATION

This application claims priority to U.S. Provisional Application No. 62/219,829 filed Sep. 17, 2015, entitled "Recovery of Electrical Energy and Water from Exhaust Gas," incorporated by reference herein in its entirety.

FIELD

This disclosure relates to the fields of recovering energy and water from exhaust gases generated by the high temperature combustion of hydrocarbons (as by the operation of burners of heating or cooling systems or thermodynamic machines driven by high temperature internal and external combustion devices and gas turbines). More particularly, this disclosure relates to a water recovery system from exhaust gasses utilizing thermoelectric generators, air cycle machines and other devices to absorb heat energy and cool the gasses for recovery of water from the gasses.

BACKGROUND

There have been a number of attempts to remove and reclaim energy and water from exhaust gases. Combustion engines generate exhaust heat, as a result of burning fossil fuels. Typically, about ⅔ of the energy used to power an engine is wasted in released exhaust heat. In addition to heat, water in the form of steam is also generated and expelled as a byproduct. In order to collect the water from the exhaust, the hot gas mixture must be cooled below the dew point, for the water to condense for collection.

Rapid cooling of the exhaust requires a substantial amount of energy and is often very expensive. Attempts have been made to capture the water from internal combustion engines. Most attempts utilize air to air heat exchangers and refrigeration units. The heat exchangers require extensive surface area and the refrigeration units are large, complex, costly, and expensive to run.

Accordingly, there is a need for methods and apparatus that improves the recovery of energy and water from exhaust gases.

SUMMARY

The disclosure advantageously provides a system that utilizes a thermoelectric generator (TEG) to produce electricity from the waste heat of the exhaust gasses of combustion engines. During the process of generating electricity using a thermoelectric generator, the exhaust is cooled by the TEG. This advantageously reduces the exhaust temperature and promotes condensation of the water from steam. In addition, the recovered electricity can be utilized to power a thermoelectric cooler to further reduce the exhaust gas temperature and increase the yield and capture.

Accordingly, in one aspect, a system for recovering electrical energy and water from exhaust gasses according to the disclosure includes an exhaust gas flowpath having exhaust gasses flowable therethrough, and a thermoelectric generator positioned in flow communication with the exhaust gas flowpath. The thermoelectric generator interacts with the exhaust gasses to produce electricity from waste heat of the exhaust gasses and also causes a reduction in temperature of the exhaust gasses.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein:

FIG. 1 is a representational view of an electrical energy and water recovery system according to the disclosure.

DETAILED DESCRIPTION

With reference to FIG. 1, the disclosure relates to a system 10 for recovering electrical energy and water from hot exhaust gases 12, such as generated by high temperature combustion of hydrocarbons in an engine, and typically having a temperature of from about 400 degrees C. to about 1000 degrees C. For example, the system 10 may be installed in an exhaust flow path 14 that directs the exhaust gasses 12 from a source of combustion such as a burner or an engine 16.

The system 10 includes a thermoelectric generator 20 (TEG). The flow path 14 from the engine 16 passes through and is in flow communication with the TEG 20. The TEG 20 operates to produce electricity from waste heat of the exhaust gasses 12. That is, the heat contained in the combustion gasses represents heat from the combustion that is not harnessed by the engine 16 and is typically expelled to the atmosphere and represents inefficiency of the engine 16. Accordingly, by converting some of this heat into electricity using the TEG 20, a recovery of some of the wasted energy of the combustion may be achieved.

In addition to the benefit of generating electricity using the TEG 20, cooling of the exhaust gasses occurs as a result of the removal of heat from the exhaust gases 12 by operation of the TEG 20 to convert heat from the exhaust gases 12 into electricity. This reduction of the temperature of the exhaust gasses 12 advantageously promotes condensation of the water from steam, which is beneficial in the recovery of water from the exhaust gases 12.

The electricity recovered by the TEG 20 can be utilized in various manners. In one embodiment, the recovered electricity may be utilized to power a thermoelectric cooler 22 and other devices configured to provide a water recovery unit 24 to further reduce the exhaust gas temperature and increase the yield and capture of water, as represented by a captured water tank 26. For example, the recovered electricity can be used to power devices such as a fan 28, a cooling pump 30 and a refrigeration unit 32.

If desired, the system may utilize membrane tubes or other filtration structures to produce potable water from the recovered and captured water.

The system may also include additional devices in the exhaust stream suitable for removing energy from the exhaust. For example, an air cycle machine 34 may be provided in the exhaust stream. A preferred air cycle machine is of a type corresponding to a turbocharger of the type used in aircraft as an air-conditioning compressor. The TEG 20 and the air cycle machine 34 together could power the air-conditioning in vehicles as well as take heat out of the exhaust to recover the water.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

The invention claimed is:

1. A system for recovering electrical energy and water from exhaust gasses, consisting essentially of:
   an exhaust gas flowpath having exhaust gasses flowable therethrough;
   a thermoelectric generator positioned in flow communication with the exhaust gas flowpath, wherein the thermoelectric generator interacts with the exhaust gasses to produce electricity from waste heat of the exhaust gasses and also causes a reduction in temperature of the exhaust gasses;
   a water recovery unit comprising a cooling device operated by electricity generated by the thermoelectric generator and configured to cause a further reduction in temperature of the exhaust gasses and promote condensation of water in the exhaust gasses to yield condensed water; and
   a water recovery tank in flow communication with the water recovery unit for capturing the condensed water from the water recovery unit.

* * * * *